(No Model.)
F. C. ZIEGLER.
MOUSING OR SAFETY HOOK.
No. 459,431. Patented Sept. 15, 1891.
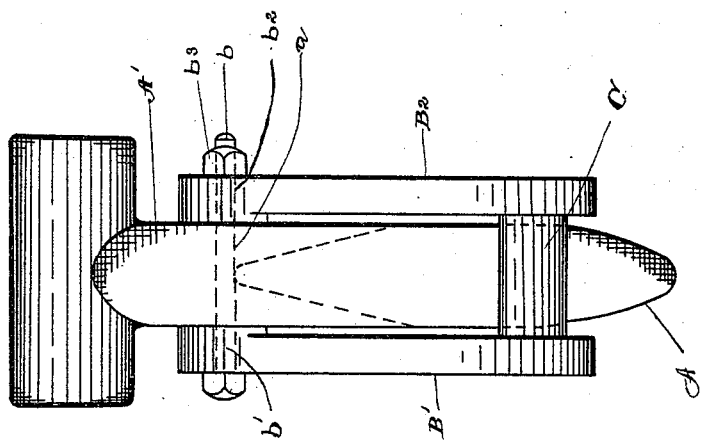
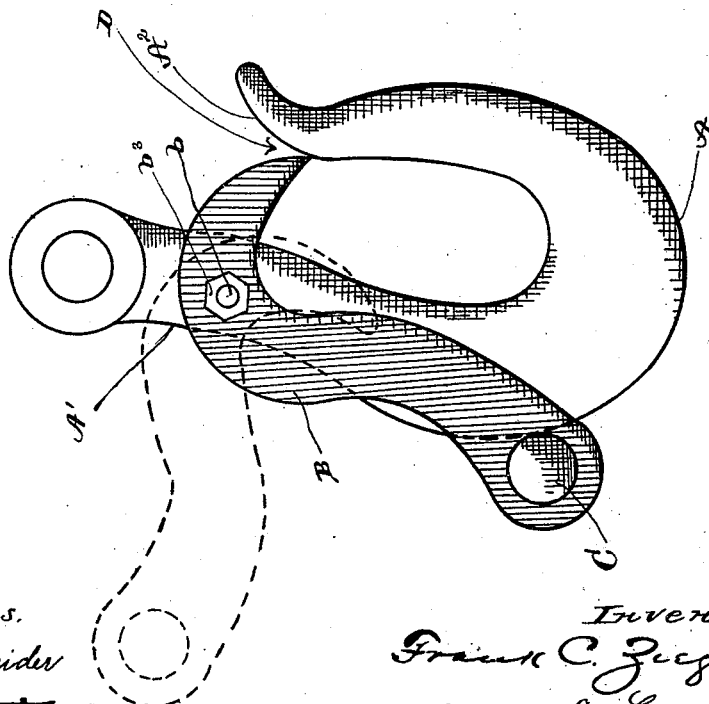

UNITED STATES PATENT OFFICE.

FRANK C. ZIEGLER, OF CLEVELAND, OHIO, ASSIGNOR TO JOHN McMYLER, OF SAME PLACE.

MOUSING AND SAFETY HOOK.

SPECIFICATION forming part of Letters Patent No. 459,431, dated September 15, 1891.

Application filed November 3, 1890. Serial No. 370,191. (No model.)

*To all whom it may concern:*

Be it known that I, FRANK C. ZIEGLER, of Cleveland, in the county of Cuyahoga and State of Ohio, have invented certain new and useful Improvements in Mousing and Safety Hooks; and I do hereby declare the following to be a full, clear, and exact description of the invention, such as will enable others skilled in the art to which it pertains to make and use the same.

My invention relates to improvements in safety or mousing hooks; and it consists in certain features of construction and in combination of parts hereinafter described, and pointed out in the claim.

With a hoisting and conveying bucket, when the load on the hook is suddenly lightened by the dumping of the contents of the bucket, there is a tendency, as is well known, to thrust the bail of the bucket upward over the bill of the hook, and not infrequently serious accidents have occurred, because there was no suitable provision made for arresting the bail in such case and preventing it from being thrust off the hook. I have therefore devised the mousing or safety hook illustrated in the accompanying drawings, wherein—

Figure 1 is a side elevation, and Fig. 2 a rear elevation.

A represents the hook, A' the shank thereof, and $A^2$ the bill. The shank of the hook has a lateral hole at $a$ for the passage of a bolt $b$.

B represents the mousing, that is preferably composed of two members B' and $B^2$, that straddle the shank of the hook. Members B' and $B^2$ are connected at or near the lower ends thereof by a cross-bar C, these parts being preferably integral. Members B' $B^2$ have lateral holes at $b'\,b^2$, respectively, through which bolt $b$ passes. Bolt $b$ is preferably screw-threaded at one end for receiving a nut $b^3$. Mousing B is, in proper language, a "gravity-mousing," having the center of gravity to the rear of its axis, and the position of the mousing shown in solid lines, Fig. 1, is approximately the position it would assume if balanced by the force of gravity, and in such position the mousing sufficiently bridges the space between the shank and the bill of the hook to prevent the latter from unhooking, and the curvature of the surface of the head of the mousing is such that in the position of parts shown in solid lines, Fig. 1, the opposing surfaces of the head of the mousing and the bill of the hook respectively approximately form a V-shaped mouth D to facilitate the entrance of the bail of the bucket.

When it is desired to release the bail, the mousing is swung to the position shown in dotted lines, Fig. 1, and when the bail is released the mousing immediately returns to its normal position by gravity, and in so doing the mousing of course would undoubtedly swing beyond its normal position were there not some suitable stop mechanism provided, and the parts would be subject to disarrangement.

Cross-bar C, acting as a stop, answers the purpose well, arresting the mousing the moment the cross-bar comes in contact with the hook and prevents any disarrangement of the parts.

The device is simple, strong, and durable. There is no possibility for the parts to become disarranged, as aforesaid, and consequently no liability to accidents.

What I claim is—

The combination, with a hook, of a mousing connected therewith, the mousing comprising two members connected at or near the lower ends thereof by a cross-bar, said cross-bar being adapted to act as a stop and retain the parts in their normal position, substantially as set forth.

In testimony whereof I sign this specification, in the presence of two witnesses, this 16th day of September, 1890.

FRANK C. ZIEGLER.

Witnesses:
C. H. DORER,
ALBERT E. LYNCH.